United States Patent Office 3,005,020
Patented Oct. 17, 1961

3,005,020
PHOSPHACYCLOHEXANES AND THE PREPARATION THEREOF
Sheldon A. Buckler, Stamford, Conn., assignor to American Cyanamid Company, New York, N.Y., a corporation of Maine
No Drawing. Filed Mar. 3, 1959, Ser. No. 796,734
7 Claims. (Cl. 260—500)

The present invention relates to novel organophosphorus compounds and to the prepartion thereof. More particularly, the instant discovery concerns 1,3-dioxa-5-phosphacyclohexanes, 2,4,6-substituted or unsubstituted, conforming to the formula

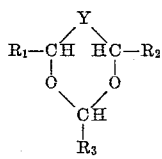

wherein $R_1$ to $R_3$ represent H; n-alkyl chains, substituted and unsubstituted, having from 1 to 8 carbon atoms; aryl chains, substituted and unsubstituted; alicyclic chains; aralkyl chains; and alkaryl chains. Y represents a radical selected from the group consisting of

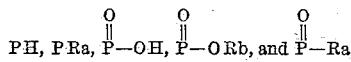

in which P represents phosphorus.

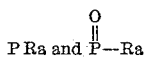

are groups within the above generic formula in which Ra represents substituted and unsubstituted alkyl chains having 1 to 6 carbon atoms, substituted and unsubstituted aryl chains, and alicyclic chains.

is a group encompassed in the above generic formula in which Rb represents substituted and unsubstituted alkyl chains having 1 to 6 carbon atoms.

The novel products described above are prepared by bringing together, in the presence of an acid catalyst and under substantially anhydrous conditions, an aldehyde conforming to the formula $$R_3-CHO$$

with a substituted or unsubstituted bis(1-hydroxyalkyl) phosphorus compound conforming to the formula

$R_1$, $R_2$ and $R_3$ in the latter two formulae corresponding, respectively, to $R_1$, $R_2$ and $R_3$ in the above product formula, and recovering the resulting product 1,3-dioxa-5-phosphacyclohexane, 2,4,6-substituted or unsubstituted.

Among the acid catalysts contemplated herein for use in the production of the novel compounds are the mineral acids, such as HCl, HBr, HI, $H_2SO_4$, and salts of these acids which are acidic under the conditions of reaction, such as Ca $Cl_2$, $FeCl_3$, and the like. Concentrated mineral acids are preferred. Other acid catalysts within the purview of the invention are the organic sulfonic acids, such as para-toluenesulfonic acid, benzenesulfonic acid, methanesulfonic acid, and similar acids.

Generally speaking, strong protonic acids have a pKa value less than about 3 are best suited as catalysts for the present invention. However, acidic substances, other than these acids, which catalyze the reaction are also contemplated herein, as indicated above.

In general, the reactions of the instant discovery are carried out at temperatures in the range of 10° C. to 150° C., preferably 60° C. to 100° C.

Typical of the numerous aldehydes encompassed by the formula $$R_3CHO$$

are benzaldehyde, heptaldehyde, cyclohexanecarboxaldehyde, paratolualdehyde, meta-nitrobenzaldehyde, para-isopropylbenzaldehyde, phenylacetaldehyde, formaldehyde, propionaldehyde, mono-chloroacetaldehyde, monohydroxyacetaldehyde, para-chlorobenzaldehyde, 3,4,-dichlorobenzaldehyde, and the like.

Likewise, typical substituted and unsubstituted bis(1-hydroxyalkyl) phosphorus reactants conforming to the formula

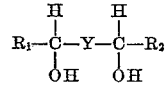

are benzyl-bis(1-hydroxybenzl)phosphine oxide, bis(2,2,2-trichloro-1-hydroxyethyl)phosphine, bis(hydroxymethyl)-phosphinic acid, bis(1-hydroxyethyl)butylphosphine, ethyl(1-hydroxybenzyl)hydroxymethyl phosphine, bis(1-hydroxyethyl)cyclohexylphosphine, bis(1-hydroxyheptyl)phenylphosphine, ethyl bis(1-hydroxybenzyl)-phosphinate, bis(1-hydroxyheptyl)phosphinic acid, parachlorobenzyl-bis(1-hydroxy-p-chlorobenzyl)phosphine oxide, and numerous others.

The amount of aldehyde reactant employed with respect to the bis(1-hydroxyalkyl) phosphorus reactant is, generally, a stoichiometric amount basis the aldehyde reactant. In other words, very desirable results are achieved by combining equimolar amounts of these reactants. However, excesses of either reactant as great as 10:1 aldehyde to bis(1-hydroxyalkyl) phosphorus, or bis(1-hydroxy-1-substituted-alkyl) phosphorus to aldehyde, or even greater, are suitable.

The process of this invention can be carried out continuously, semi-continuously or by batch technique, at atmospheric, super-atmospheric or sub-atmospheric pressures.

If desired, reaction according to the instant discovery may be carried out in the presence of an inert organic solvent. Typical of these solvents are benzene, dioxane, ether, and the like. The inert solvent or liquid medium is, preferably, one which is inert during the reaction, i.e., one which is substantially non-reactive with the reactants and with the desired product.

Admixture of the reactants may be carried out in any suitable manner which provides proper intermingling of the reactants.

Likewise, recovery of the product formed may be brought about by any suitable or conventional means. Generallly, the solvent, if any, is removed from the product mixture by evaporation and the product remains as a residue.

The novel products of the present invention are useful in extracting metal values, such as uranium values. The compounds contemplated herein selectively complex uranyl ions in an ore containing the uranyl values. A known process for selectively leaching uranyl values from an ore is shown by Blake et al. in Atomic Energy Commission Report ORNL–1903, May 13, 1955.

The present discovery will best be understood by reference to the following illustrative examples. The limitations contained in these examples are not to be considered as restrictions upon the scope of the invention, since it will be obvious to one skilled in the art that numerous modifications within the purview of the invention are possible and, by the same token, are contemplated herein.

EXAMPLE I

*Preparation of 2,4,6-triphenyl-5-benzyl-1,3-dioxa-5-phosphacyclohexane 5-oxide*

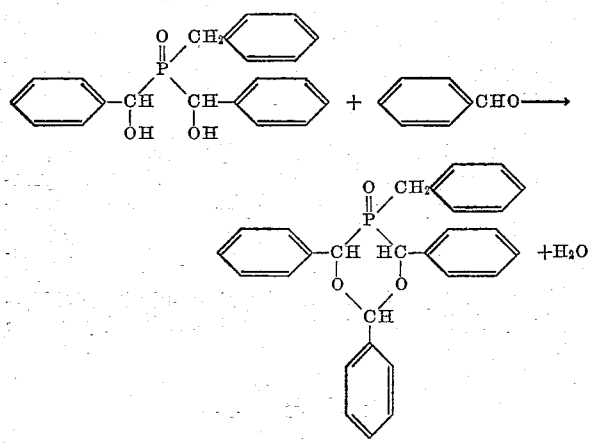

A solution of 4 milliliters of benzaldehyde, 15 milliliters of dry benzene, and 0.1 gram of p-toluenesulfonic acid is prepared and 2.0 grams of benzyl-bis(1-hydroxybenzyl)phosphine oxide is added. This mixture is heated under reflux for 20 hours and the resulting solution is evaporated to a constant weight at 1 millimeter (mercury) pressure and 75° C. The residue is washed with ether and filtered to give 1.64 grams (66 percent by weight of theory) of product.

One and four-tenths grams of the product is treated with 50 milliliters of boiling ethyl acetate and filtered. The insoluble portion is twice recrystallized from dioxane to give a crystalline product melting point 220° C.–222° C., the product being 2,4,6-triphenyl-5-benzyl-1,3-dioxa-5-phosphacyclohexane 5-oxide.

*Analysis.*—Calculated for $C_{28}H_{25}O_3P$: C, 76.35; H, 5.72; P, 7.03. Found: C, 76.32; H, 5.89; P, 7.15.

EXAMPLE II

*Preparation of 2-hexyl-4,6-bis(trichloromethyl)-1,3-dioxa-5-phosphacyclohexane*

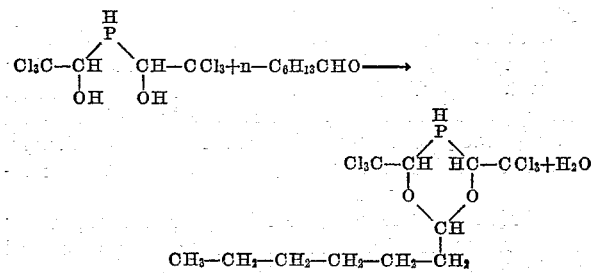

A solution of 5 milliliters of normal heptaldehyde, 20 milliliters of dry benzene and 0.1 gram of p-toluenesulfonic acid is prepared and 3.29 grams of bis(2,2,2-trichloro-1-hydroxyethyl)phosphine is added. This mixture is heated under gentle reflux for 8 hours. At intervals of 1 to 2 hours small quantities (0.5 gram) of benzene are distilled from the mixture to remove the water which is formed in the reaction as an azeotropic mixture. The volatile materials are then evaporated to a constant weight at 1 millimeter (mercury) pressure and 75° C. giving the product 2-hexyl-4,6-bis(trichloromethyl)-1,3-dioxa-5-phosphacyclohexane in the form of a yellow liquid.

EXAMPLE III

*Preparation of 2-cyclohexyl-1,3-dioxa-5-phosphacyclohexan-5-oic acid*

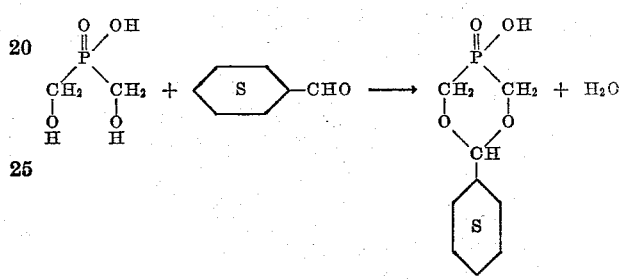

A solution of 6.0 grams of cyclohexanecarboxaldehyde and 3.0 grams of bis(hydroxymethyl)phosphinic acid in 20 milliliters of anhydrous dioxane is prepared and 1.0 gram of powdered calcium chloride is added. The mixture is heated under reflux for 2 hours and filtered while hot. Product 2-cyclohexyl-1,3-dioxa-5-phosphacyclohexan-5-oic acid is recovered from the filtrate as a white solid by evaporating the volatile materials in vacuo until the residue has a constant weight at 1 millimeter (mercury) pressure and 75° C.

EXAMPLE IV

*Preparation of 2-para-tolyl-4,6-dimethyl-5-normal-butyl-1,3-dioxa-5-phosphacyclohexane*

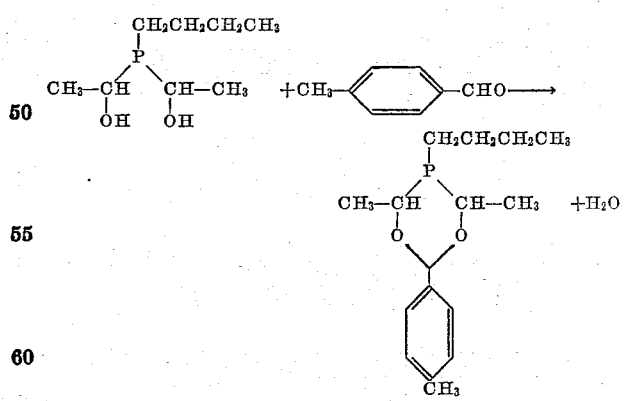

A solution of 10.0 grams of para-tolualdehyde, 5.0 grams of bis(1-hydroxyethyl)butylphosphine, and 0.2 gram of benzenesulfonic acid in 25 milliliters of dry benzene is prepared and heated under reflux for 10 hours. At 1–2 hour intervals small amounts (0.5 gram) of benzene are distilled from the mixture to remove the water which is formed in the reaction as an azeotropic mixture. At the end of 10 hours, the volatile materials are evaporated in vacuo to a constant weight at 1 millimeter pressure and 75° C. leaving the product 2-para-tolyl-4,6-dimethyl-5-normal-butyl-1,3 - dioxa - 5 - phosphacyclohexane as a colorless liquid residue.

EXAMPLE V

*Preparation of ethyl 2-meta-nitrophenyl-4-phenyl-1,3-dioxa-5-phosphacyclohexan-5-oate*

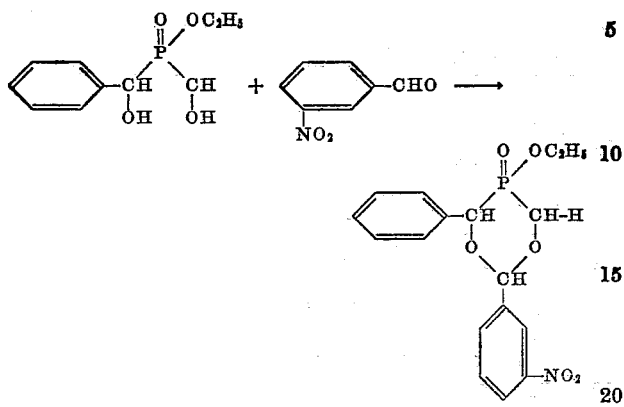

A mixture of 2.3 grams of ethyl(1-hydroxybenzyl)hydroxymethyl phosphinate, 1.5 grams of meta-nitrobenzaldehyde, and 1.0 gram of powdered calcium chloride and 25 milliliters of anhydrous dioxane is prepared and heated under reflux for 8 hours. The solution is filtered while hot and the product 2-meta-nitrophenyl-4-phenyl-1,3-dioxa-5-phosphacyclohexan-5-oate recovered as a pale yellow solid by evaporation of the filtrate in vacuo to a constant weight at 1 millimeter (mercury) pressure and 75° C.

EXAMPLE VI

*Preparation of 2,5-dicyclohexyl-4,6-dimethyl-1,3-dioxa-5-phosphacyclohexane*

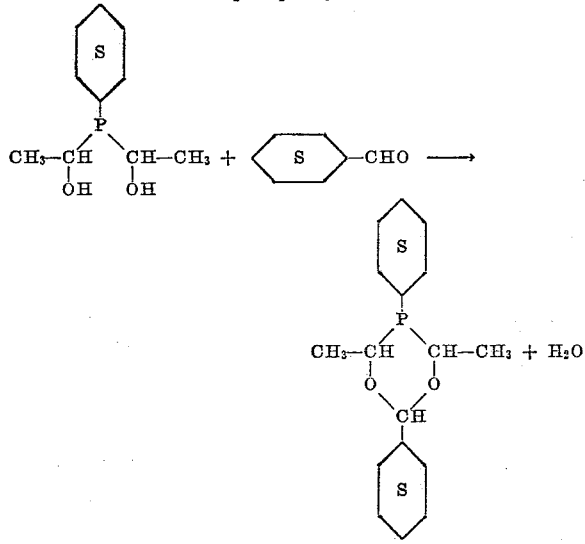

A mixture of 10.0 grams of cyclohexanecarboxaldehyde, 5.0 grams of bis(1-hydroxyethyl) cyclohexylphosphine, and 0.1 gram of concentrated sulfuric acid in 30 milliliters of dry dioxane is heated under reflux for 6 hours. The volatile materials are evaporated until a constant weight is achieved at 1 millimeter (mercury) and 75° C. The product 2,5-dicyclohexyl-4,6-dimethyl-1,3-dioxa-5-phosphacyclohexane is a colorless liquid residue.

EXAMPLE VII

*Preparation of 2-benzyl-4,6-dihexyl-5-phenyl-1,3-dioxa-5-phosphacyclohexane*

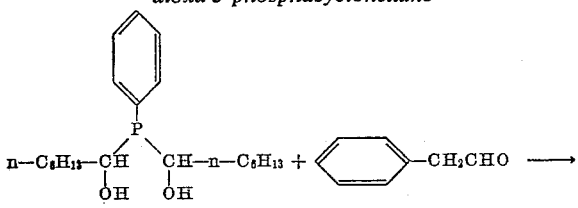

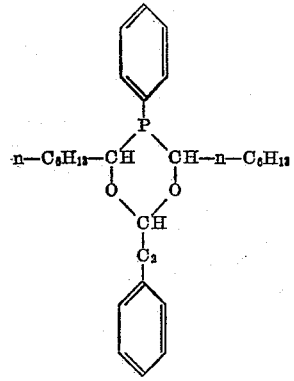

A solution of 12.0 grams of phenylacetaldehyde, 6.0 grams of bis(1-hydroxyheptyl)phenylphosphine, and 0.1 gram of methanesulfonic acid in 40 milliliters of dry benzene is prepared and heated under reflux for 15 hours. At 2 hour intervals 0.5 gram portions of benzene are distilled from the mixture to remove the water which is formed in the reaction as an azeotropic mixture. After this time, the volatile materials are evaporated at 0.5 millimeter (mercury) and 75° C. leaving the product 2-benzyl - 4,6 - dihexyl - 5 - phenyl - 1,3 - dioxa - 5 - phosphacyclohexane as a liquid residue.

The following Examples VIII, IX, X and XI disclose the preparation of the organophosphorus reactants in the above Examples IV, V, VI and VII, respectively:

EXAMPLE VIII

*Preparation of bis(1-hydroxyethyl)butylphosphine*

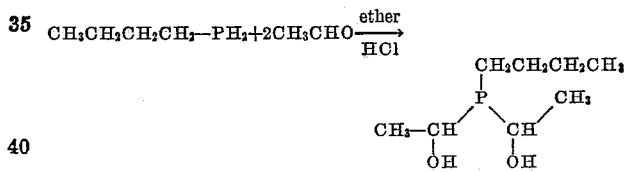

A solution of 9.2 grams of normal-butylphosphine and 8.8 grams of acetaldehyde in 100 milliliters of ether is prepared and 4 grams of dry HCl gas is passed into the solution. After 30 minutes the ether is removed by evaporation and the product bis(1-hydroxyethyl)butylphosphine recovered from the residue after neutralization with alcoholic sodium hydroxide.

This product is one of the reactants in Example IV, above.

EXAMPLE IX

*Preparation of ethyl(1-hydroxybenzyl)hydroxymethyl phosphinate*

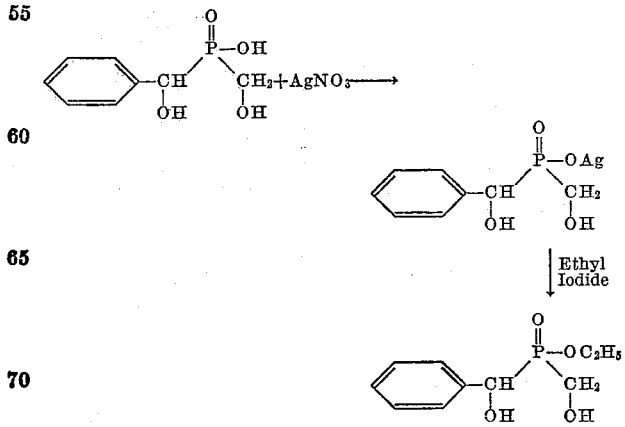

An aqueous solution of 10.1 grams of 1-hydroxybenzyl hydroxymethylphosphinic acid is treated with an aqueous solution of 8.5 grams of silver nitrate. The white solid silver salt which precipitates is filtered, washed with water and dried in vacuo. It is then suspended in a finely-divided form in acetonitrile (100 milliliters) and 15 milliliters of ethyl iodide is added. The mixture is stirred and refluxed for 8 hours and then filtered. The product ethyl(1-hydroxybenzyl)hydroxymethyl phosphinate is recovered as a white solid by evaporating the filtrate.

This product is one of the reactants in Example V, above.

EXAMPLE X

*Preparation of bis(1-hydroxyethyl)cyclohexylphosphine*

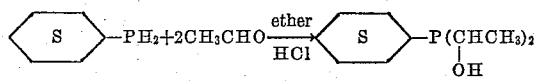

This material is prepared by the same procedure described in Example VIII, above, with the exception that 11.6 grams of cyclohexylphosphine is substituted for the n-butylphosphine.

The product of this example is one of the reactants in Example VI, above.

EXAMPLE XI

*Preparation of bis(1-hydroxyheptyl)phenylphosphine*

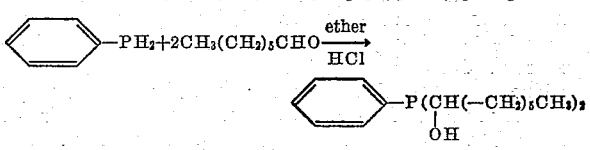

A solution of 11.0 grams (0.1 mole) of phenylphosphine and 22.8 grams (0.2 mole) of heptaldehyde in 150 milliliters of dry ether is prepared and 4 grams of dry HCl is introduced therein. After 30 minutes the ether is removed by evaporation and the product bis(1-hydroxyheptyl)phenylphosphine is recovered from the residue after neutralization with alcoholic sodium hydroxide.

This product is one of the reactants in Example VII, above.

While the present invention has been described in detail with respect to certain typical and specific embodiments thereof, it is not intended that these limitations exert undue restrictions upon the scope of the invention, excepting, of course, insofar as the limitations appear in the appended claims.

I claim:

1. Organophosphorous compounds of the formula

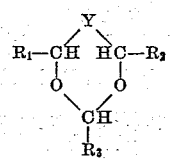

wherein $R_1$–$R_3$, respectively, represent a member selected from the group consisting of H; n-alkyl of from 1 to 8 carbon atoms; substituted n-alkyl of from 1 to 8 carbon atoms, said substituents being selected from the group consisting of hydroxy and halogen; phenyl; substituted phenyl, said substituents being selected from the group consisting of nitro, halogen and lower alkyl; cyclohexyl; benzyl; and Y represents a radical selected from the group consisting of

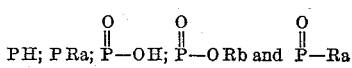

in which P represents phosphorous;

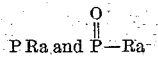

are groups within the above generic formula in which Ra is a member of the group consisting of alkyl of 1 to 6 carbon atoms, benzyl, phenyl and cyclohexyl and

is a group encompassed in the above generic formula in which Rb is alkyl of 1 to 6 carbon atoms.

2. 2,4,6 - triphenyl-5-benzyl-1,3-dioxa-5-phosphacyclohexane 5-oxide.

3. 2-hexyl - 4,6-bis(trichloromethyl)-1,3-dioxa-5-phosphacyclohexane.

4. 2-cyclohexyl - 1,3-dioxa-5-phosphacyclohexan-5-oic acid.

5. 2-para - tolyl-4,6-dimethyl-5-normal-butyl-1,3-dioxa-5-phosphacyclohexane.

6. 2-benzyl - 4,6-dihexyl-5-phenyl-1,3-dioxa-5-phosphacyclohexane.

7. A method of preparing 1,3-dioxa-5-phosphacyclohexanes of the formula

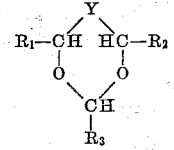

wherein $R_1$, $R_2$ and $R_3$, respectively, represent a member selected from the group consisting of H; n-alkyl of from 1 to 8 carbon atoms; substituted n-alkyl of from 1 to 8 carbon atoms, said substituents being selected from the group consisting of hydroxy and halogen; phenyl; substituted phenyl, said substituents being selected from the group consisting of nitro, halogen and lower alkyl; cyclohexyl; benzyl; and Y represents a radical selected from the group consisting of

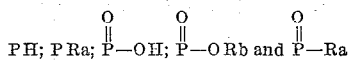

in which P represents phosphorous;

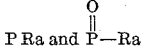

are groups within the above generic formula in which Ra is a member of the group consisting of alkyl of 1 to 6 carbon atoms, benzyl, phenyl and cyclohexyl and

is a group encompassed in the above generic formula in which Rb is alkyl of 1 to 6 carbon atoms; which comprises bringing together in the presence of an acid catalyst and under substantially anhydrous conditions an aldehyde of the formula $R_3CHO$ and a bis (1-hydroxyalkyl) phosphorous compound of the formula

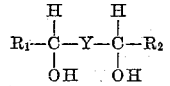

wherein $R_1$, $R_2$, $R_3$ and Y are as defined above, and recovering the resulting 1,3-dioxa-5-phosphacyclohexane product.

No references cited.

UNITED STATES PATENT OFFICE
CERTIFICATE OF CORRECTION

Patent No. 3,005,020                  October 17, 1961

Sheldon A. Buckler

It is hereby certified that error appears in the above numbered patent requiring correction and that the said Letters Patent should read as corrected below.

Column 6, lines 1 to 15, the formula should appear as shown below instead of as in the patent:

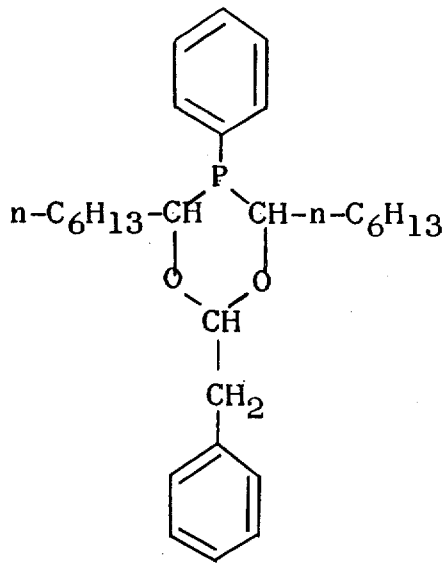

Signed and sealed this 8th day of May 1962.

(SEAL)
Attest:

ERNEST W. SWIDER                  DAVID L. LADD

Attesting Officer                  Commissioner of Patents